Jan. 22, 1924.
T. F. LENNON
1,481,379
ATTACHMENT FOR RAKES
Original Filed Aug. 21, 1922
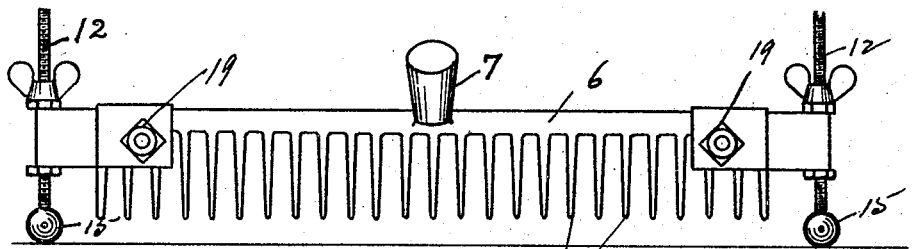
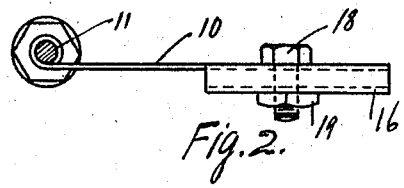
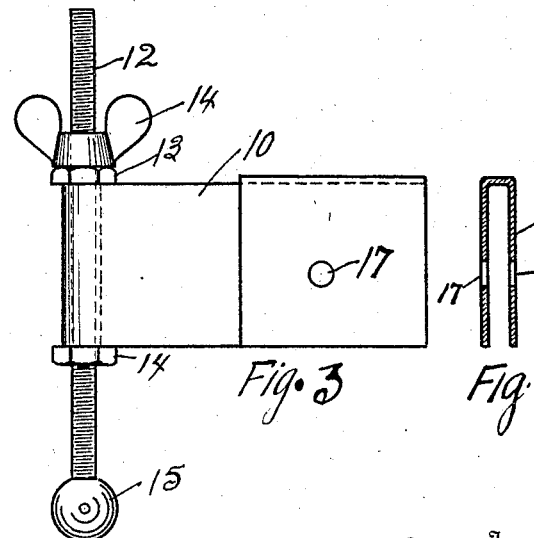
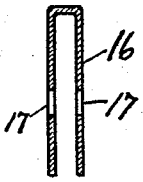
Inventor
Thomas F. Lennon
By
Hardway Cathey
Attorneys Patented Jan. 22, 1924.

1,481,379

UNITED STATES PATENT OFFICE.

THOMAS F. LENNON, OF CROSBY, TEXAS.

ATTACHMENT FOR RAKES.

Application filed August 21, 1922, Serial No. 583,166. Renewed October 19, 1923.

*To all whom it may concern:*

Be it known that I, THOMAS F. LENNON, citizen of the United States, residing at Crosby, in the county of Harris and State of Texas, have invented certain new and useful Improvements in Attachments for Rakes, of which the following is a specification.

This invention relates to new and useful improvements in an attachment for rakes, and more particularly to such rakes as are used for yard and garden use.

One object of the invention is to provide a device of the character described which will hold the teeth of the rake off of the ground when raking up loose grass after a lawn has been mowed.

Another object of the invention is to provide a device of the character described to which the attachment may be readily secured or detached therefrom as occasion demands.

With the above and other objects in view this invention has particular relation to certain novel features of construction, operation and arrangement of parts, an example of which is given in this specification and illustrated in the accompanying drawings, wherein:—

Figure 1 shows a rear view of a rake having my attachments connected thereto, and with the handle thereof removed for the sake of clearness.

Figure 2 shows a plan view of one of the attachments.

Figure 3 shows a side elevation of one of the attachments.

Figure 4 shows a sectional view through the clamp portion taken on the line a—a of Figure 3, and Figure 5 shows a side elevation of the rake with the clamps attached.

Referring now more particularly to the drawings, wherein like numerals of reference designate similar parts in each of the figures, the numeral 6 refers to the rake proper which has the usual cuff 7 and handle 8, the teeth 9 being of the usual and customary form. The numeral 10 refers to a clamp member, one end of which has a sleeve 11 through which the bolt 12 passes and below the clamp member, and screwed upon the threaded bolt 12 are the nuts 13 and 14, and a thumb lock nut 14 is screwed upon top of nut 13 to secure the nuts tight upon clamp 10. Upon the lower end of bolt 12 is a round knob 15. The other end of member 10 is formed with a U-shaped clamp, as shown at 16 in Figure 4, aligned holes 17, 17 are provided through the clamp and are adapted to receive the bolt 18, by means of which the clamp member is secured to the end of the rake.

When it is desired to put these clamp members upon the rake the clamp 10, shown at 16, is slipped down over the top of each end of the rake, as shown in Figure 1. The bolt 18 is then inserted through holes 17, 17, and the nut 19 is screwed down tightly and the clamp members are then held secure upon the rake, and the knobs 15 of the bolts 12 are adjusted so as to hold the rake teeth sufficiently high off the ground so that the teeth of the rake will pick up the loose grass, but will miss the runners leaving the lawn in good shape, practically free of any loose grass without disturbing the feeders or runners of the grass.

What I claim is:—

The combination with a rake of clamp members detachably secured to each end thereof, each clamp member being formed with an end sleeve forming a vertical bearing, rods fitted through said sleeves and adjustably secured therein, the lower ends of said rods being formed with round heads.

In testimony whereof I have signed my name to this specification in the presence of two subscribing witnesses.

THOMAS F. LENNON.

Witnesses:
C. G. JOHNSON,
P. H. BROWN.